Dec. 12, 1961 D. D. ROBERTSON 3,013,222

SIGNAL TRANSLATING SYSTEM

Original Filed Dec. 27, 1945 2 Sheets-Sheet 1

INVENTOR
D. D. ROBERTSON
BY Robert J. Fluskey
ATTORNEY

SIGNAL TRANSLATING SYSTEM

Original Filed Dec. 27, 1945

2 Sheets-Sheet 2

INVENTOR
D. D. ROBERTSON
BY Robert J. Fluskey
ATTORNEY

1

3,013,222

SIGNAL TRANSLATING SYSTEM

Donald D. Robertson, Morristown, N.J., assignor to Bell Telephone Laboratories, Incorporated, New York, N.Y., a corporation of New York Original application Dec. 27, 1945, Ser. No. 637,410. Divided and this application June 7, 1950, Ser. No. 166,641
5 Claims. (Cl. 331—144)

This is a division of application Serial No. 637,410, filed December 27, 1945, now abandoned, by the present inventor, for Signal Translating System.

This invention relates to signal translating systems and more particularly to such systems of the echo ranging type especially suitable for utilization in the steering of torpedoes.

In echo ranging torpedo steering systems, such as disclosed in the application, Serial No. 637,411, filed December 27, 1945, of William R. Harry, signal pulses of preassigned duration, or length, and recurrence rate are propagated from the torpedo and echoes of these pulses are resolved in a receiver into a control potential of amplitude and polarity determined by the bearing, relative to the torpedo, of the object from which the echoes emanate. A directional translator is controlled in accordance with this potential to effect steering of the torpedo toward the target. The signal pulses may be propagated by a transducer, serving also as the input element for the receiver, energized periodically by an electronic oscillator controlled by a timer, for example a multivibrator.

The maximum effective range of the echo ranging system is dependent upon the power of the pulses propagated and their recurrence rate. In so far as the power is involved, attainment of a long range necessarily entails provision of a high power energizing source and this, in turn, in systems where this source is an electronic oscillator, presents problems incident to the keying of the oscillator. In so far as the factor of recurrence rate is involved, it is advantageous that the period between successive pulses be long in comparison to the pulse propagating period.

Further, in an echo ranging system and particularly one utilized for steering of a torpedo, certain operations must occur in proper sequence. For example, in instances where an echo is received late in the cycle, that is, shortly before the next pulse is to be propagated, in order that target bearing information as represented by this echo may not be lost, propagation of the next pulse should be delayed until the echo signal has been resolved and the torpedo course corrected in accordance therewith. However, such delay should not affect the pulse length.

One general object of this invention is to improve the performance of echo ranging systems and particularly of such systems especially suitable for steering of torpedoes.

More specifically, objects of this invention are to enable efficient and expeditious keying of a high power electronic oscillator, to assure stable operation of a multivibrator for producing pulses of short length relative to the interval between pulses, and to insure proper sequential operation of elements in an echo ranging system.

In accordance with one feature of this invention, a high power electronic oscillator of the screen grid type, having its screen grid biased normally at a blocking potential, is controlled by keying a relatively low power electron discharge device, the latter being effective when rendered conducting to overcome the blocking bias upon the screen grid. The device mentioned can be keyed with relatively small power expenditure so that efficient control of the oscillator is obtained. Further, inasmuch as the oscillator is keyed by controlling the screen grid potential, control of the oscillator is effected independently of and without disturbing the oscillating circuits.

2

In one illustrative construction, the auxiliary device is keyed by a single pulse electronic vibrator or pulser which is triggered by a multivibrator, the latter determining the overall pulsing period duration and the pulse recurrence rate.

In accordance with still another feature of this invention, in the multivibrator, which is of the type comprising a pair of electron discharge devices and a resistance-capacity timing circuit coupling the anode of each device to the control electrode of the other, an auxiliary discharge device is associated with the timing circuit fixing the pulse recurrence rate, to provide a relatively low impedance path for the change of charge of the condenser in this circuit, whereby complete change of charge of this condenser within the requisite time and stable operation of the multivibrator are assured.

In accordance with a further feature of this invention, the time constant of the resistance-capacity circuit which determines the length of the pulsing period is controlled in accordance with operation of the device which results in initiation of the pulsing period, to fix the end of this period. More specifically, in accordance with this further feature of the invention, the auxiliary discharge device aforenoted is arranged to render another device conductive when the device which results in the pulse is non-conducting. This additional device controls a relay which, upon operation, closes a low resistance path through the condenser in the timing circuit in question so as to shorten the discharge time of the condenser. For example, in a specific case, if the normal time constant for this circuit is 400 milliseconds, the relatively low resistance path may be such that the time constant, measured from the instant of completion of this path is 150 milliseconds, the corresponding pulse length being 50 milliseconds. The energizing circuit for the relay may include a switch controlled by the translator in such manner that following receipt of an echo the switch will be closed only when the torpedo course has been corrected in accordance with the resulting control signal.

In accordance with a still further feature of this invention, the relay above-noted controls the triggering circuit for the pulser and the parameters of this circuit are correlated so that the pulser will be triggered by initial operation of the relay and will be substantially unaffected by relay chatter or power leakage in the echo ranging system.

The invention and the above-noted and other features thereof will be understood more clearly and fully from the following detailed description with reference to the accompanying drawing in which.

Figures 1, 2:
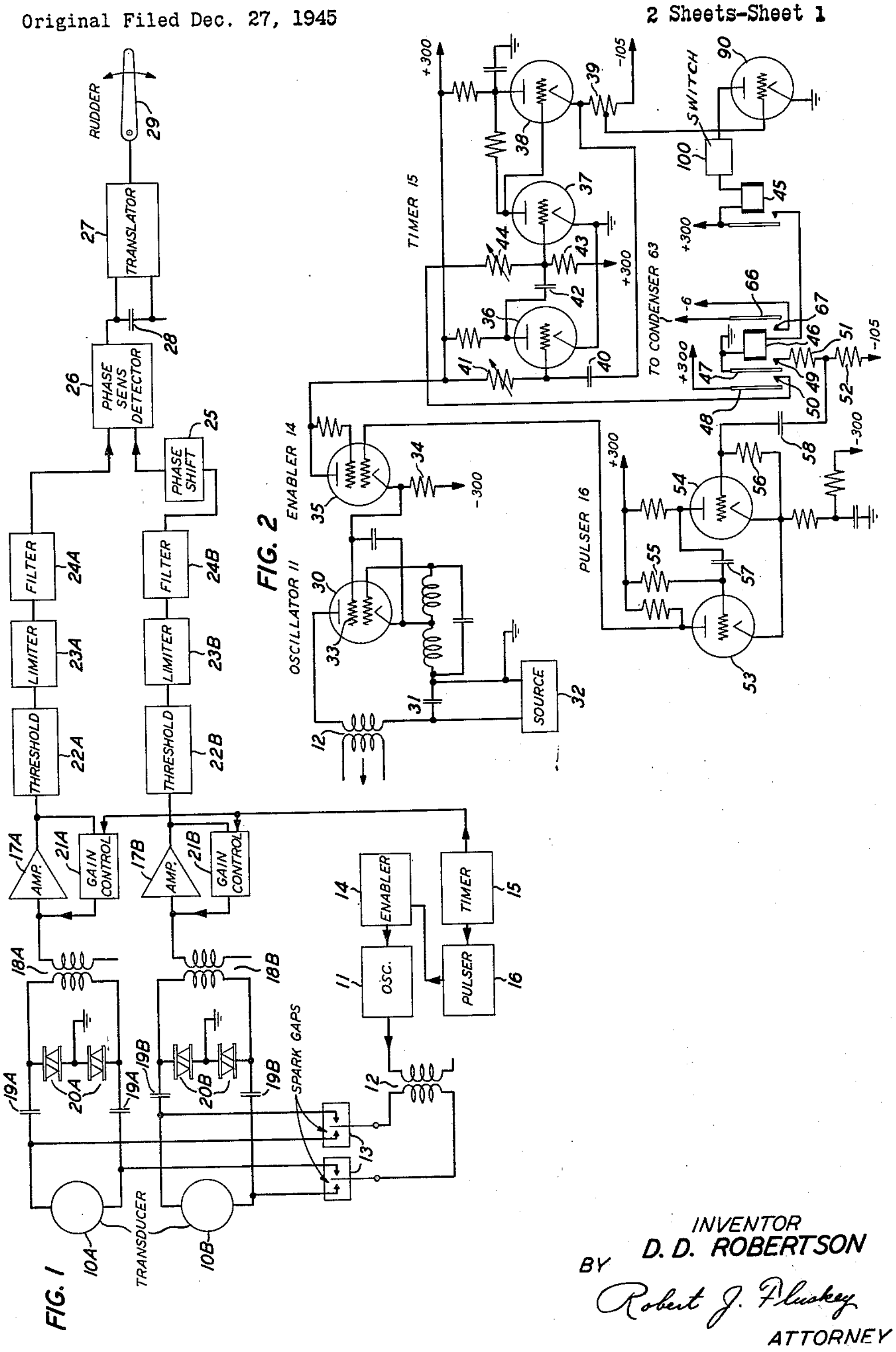
FIG. 1 is a diagram, mainly in functional block form, of a torpedo steering system illustrative of one embodiment of this invention.
FIG. 2 is a circuit diagram of the oscillator and associated controls therefor included in the system shown in FIG. 1.

Referring now to the drawing, the steering system illustrated in FIG. 1 comprises a submarine signal transducer, for example of the piezoelectric crystal type, having two similar halves 10A and 10B, and which, in the operation of the system, serves as both a projector and a detector of supersonic submarine signals. The transducer may be mounted in the nose of the torpedo and is designed to have a directional pattern, the primary lobe of which is of limited width, i.e., is included within a limited angle to either side, both horizontally and vertically, of the longitudinal axis of the torpedo. For example, for the transducer as a whole, i.e., with the two halves operated in parallel, the included angles of the primary lobes in the horizontal and vertical directivity patterns may be of the order of 36 and 20 degrees respectively and these angles for each half may be of the order of 80 and 20 degrees, respectively. The two halves 10A and 10B are spaced center to center a distance substantially equal to the wavelength of the operating frequency of the system so that during reception, the phase relation of the outputs of the two halves is a measure of the magnitude and sign of the horizontal angle between the longitudinal axis of the torpedo and the source of the signals received.

When the transducer is operated as a projector, the two halves thereof are operated in parallel and energized from a supersonic oscillator 11 by way of a transformer 12 and switching elements 13, such as spark gaps, which connect the transducer to the oscillator when the oscillator is operating and effectively isolate the two during the periods in which the transducer is operated as a detector or receiver.

The oscillator 11 advantageously is tuned to a frequency somewhat below that of maximum sensitivity of the receiver system and serves to produce pulses or spurts of signals of the frequency to which it is tuned, of preassigned duration and recurrence rate, the oscillator being controlled for this purpose by the combination of an enabler 14, timer 15 and pulser 16. For example, in an illustrative system, the oscillator may be constructed and controlled to produce 27-kilocycle signal pulses of 3 milliseconds duration at 1-second intervals.

When the transducer is utilized for reception, the two halves thereof operate separately, each serving as the input elecent for a respective channel of the receiver system. The two channels, except for a phase shift noted hereinafter, are identical and in the drawing corresponding elements thereof are identified by the same reference numeral plus the identifying letter, A or B, of the respective half of the transducer. Each channel comprises an amplifier 17, the input side of which is coupled to the respective transducer half by a transformer 18. The primary of each transformer is connected across the respective transducer half through suitable condensers 19. In order to segregate the receiver channels from the transducer during the pulse propagating periods, bi-directional non-linear resistances 20, for example of the silicon-carbide type known commercially as "Thyrite" elements, are provided as shown. These elements have a very high resistance for small voltages but present a relatively low resistance for voltages above a preassigned value. Thus, during the propagation of signal pulses, which are of high voltage, the elements 20 serve as by-passes for the primary windings of the transformers 18 so that, effectively, the channels are disconnected from the transducer. However, during the reception periods, the signals received by the transducer being of low voltage, the elements 20 have such a high resistance as to not affect materially the operation of the receiver.

Each amplifier is provided with a gain control 21 which, as pointed out in detail hereinafter, adjusts the amplifier gain during the reception periods so that the reverberation component in the amplifier output is maintained substantially constant while the components due to echoes received at the transducer 10 appear as peaks in the amplifier output. Following each amplifier are a threshold device 22, which functions to permit only echo signals of at least a preassigned amplitude to pass, a limiter 23, which functions to convert all signals of at least a prescribed amplitude into constant amplitude voltages and a filter 24, which is designed to pass only a restricted band of frequencies, including the frequency of the oscillator 11, specifically to pass signals of the oscillator frequency within set limits of variation and as modified due to Doppler effects. In a specific system wherein the oscillator frequency is 27 kilocycles, filters 24 capable of passing the band from 26.25 to 29.25 kilocycles have been found satisfactory.

Advantageously, the minimum level set by the threshold devices 22 and the maximum level set by the limiters 23 are made close so that amplitude differences in the outputs of the two channels are substantially eliminated. The filters 24 effectively eliminate all signals except those due to echoes of the supersonic pulses propagated by the transducer. Consequently, at the outputs of the two filters, the signals in the two channels differ essentially only in phase, if at all, so that the relative phase of the two outputs is an accurate measure of the direction, relative to the torpedo, of the object from which the echoes emanate.

The two outputs, one shifted 90 degrees in a suitable phase shifting network 25 to avoid ambiguity, are applied to a phase sensitive detector 26 and resolved thereby into a direct current potential of polarity determined by the sign and of amplitude proportional to the magnitude of the horizontal angle between the source of the echoes and the longitudinal axis of the torpedo. This potential is applied to a translator 27, as by way of a condenser 28, to effect deflection of the rudder 29 to turn the torpedo in the direction and to the extent requisite to steer it toward the source of the echoes, i.e., the target. Details of one translator which may be employed are described fully in the application of William R. Harry identified hereinabove.

Details of the oscillator 11 and associated controls are shown in FIG. 2. In order to simplify the drawing, in this figure and also in FIG. 3, the sources for supplying the various potentials for the electron discharge devices have been omitted and instead, and in order to facilitate description of the organization and operation, voltages illustrative of those employed in a typical system have been indicated. All voltages indicated are with reference to ground.

Referring now to FIG. 2, the oscillator 11 comprises an electron discharge device 30, or two or more such devices in parallel, the anode circuit of which includes a condenser 31 arranged to be charged to a high voltage, for example of the order of 3,000 volts, by a suitable source 32. Normally, the screen grid 33 of the device 30 has applied thereto, by way of a resistor 34 in the cathode circuit of the electron discharge device 35, a negative potential sufficient to render the device 30 nonconductive.

The enabler device 35 also is non-conducting normally and is rendered conducting by the application of a signal pulse of length equal to the desired high frequency pulses to be propagated, by the action of the timer 15 and pulses 16.

The timer is an unsymmetrical multivibrator comprising electron discharge devices 36, 37 and 38 designed to produce voltage pulses at the cathode resistor 39 of the device 38, of duration substantially greater than that of the high frequency signal pulses to be propagated and of the same recurrence rate as such signals. The recurrence rate is determined by the time constant of the circuit including the condenser 40 and adjustable resistor 41. The pulse length or duration time is determined by the constants of the circuit including condenser 42, a resistor 43 and an adjustable resistor 44 in a manner which will be set forth presently. In an illustrative system, the parameters involved may be made such that pulses of substantially 50 milliseconds duration are produced at a rate of about once per second.

These pulses are applied to the control grid of an electron discharge device 90 which normally is non-conducting and is rendered conducting periodically, i.e., for the time that each pulse is applied to the control grid thereof. The output circuit of the device 90 includes a switch 100, the function of which will be described presently, and a relay 45 which controls the operation of a second relay 46 over an obvious circuit, the relay 46 having armatures 47 and 48 and associated contacts 49 and 50, respectively. The armatures 47 and 48 are connected to ground and a positive potential point respectively as shown; the contact 49 is connected to a negative potential point by way of resistors 51 and 52, the former being very small in comparision to the latter; the contact 50 is connected directly to one end of the resistor 44 as shown.

The pulser 16 is a single pulse generator comprising a pair of similar electron discharge devices 53 and 54, the control grids of which are biased unequally over resistors 55 and 56 respectively so that normally the device 53 is conducting and the device 54 is non-conducting. As shown, the grid of the device 53 is tied to the anode of the device 54 by a condenser 57 and the control grid of the device 54 is connected to the point between the resistors 51 and 52 by way of a condenser 58. The anode of the device 53 is connected directly to the control grid of the enabler device 35 as shown.

The operation of the system illustrated in FIG. 2 is as follows: Normally the oscillator device 30 is blocked because of the high negative bias applied to the screen grid 33 and, while the device 30 is non-conducting, the condenser 31 is charged by the source 32. Upon application of the energizing potentials to the several electron discharge devices, the multivibrator 36, 37, 38 is set into operation. At this point it may be noted that the control grid potential of the device 90 follows that of the cathode of the device 38, which in turn follows that of the control grid of the device 38. The potential of the latter grid varies in accordance with that of the anode of the device 37. As noted heretofore, the multivibrator is unsymmetrical, one time constant, i.e., that for the one-second portion of the cycle being determined by the condenser 40, resistor 41 and impedance of device 38, the impedance of device 38 being small to assure complete discharge of the condenser 40 in the requisite time. The other time constant involved is determined initially by the condenser 42 and resistor 43 and is relatively long, e.g., of the order of 400 milliseconds. However, when, in the multivibrator cycle, the anode of the device 37 is highly positive, the grid potential of the device 38 likewise is relatively highly positive so that, by virtue of the coupling provided by the resistor 39, the potential of the grid of the device 90 is raised sufficiently to render this device conducting whereby, assuming switch 100 to be closed, the relay 45 operates and, consequently, the relay 46 operates. Operation of the latter results in closure of a circuit from 300 volts positive over armature 48 and contact 50 through the resistor 44. The latter is small in comparison to the resistor 43. Hence, the time constant for the condenser 42 is greatly reduced so that the over-all pulse period dependent upon the condenser 42 is substantially 50 milliseconds. At the end of this 50-millisecond period, the grid potential of the device 90 falls abruptly so that the relay 45 releases and the relay 46 also releases. The cycle is then repeated.

It is apparent that the end of the pulsing period, i.e., the substantially 50-millisecond period, is determined by the operation of the relay 46, which is controlled by the relay 45. The switch 100, included in the energizing circuit for the relay 45, is controlled by the translator in a manner described in the aforementioned application of William R. Harry, so that, following receipt of an echo by the receiver, the switch is opened and subsequently closed only when the torpedo course has been corrected in accordance with the echo signal as it appears across the condenser 28. Some elapse of time is involved in the translation of such echo signal into course correction. Because of the combination described, in the event an echo is received late in any cycle, i.e., shortly before the initiation of the next pulsing period, the nominally 50-millisecond period is prolonged to allow resolution of the signal into course correction before propagation of the next signal pulse by the transducer 10. Inasmuch as operation of the pulse 16 is delayed by the operate times of the relays 45 and 46 following firing of the device 90, overlap of the 3-millisecond and 50-millisecond periods obtains and proper sequence of operations in the system is assured.

When the relay 46 operates, one terminal of the condenser 58 is connected to ground over resistance 51, contact 49 and armature 47. Hence, a sharp positive pulse is applied to the grid of the normally non-conductive device 54 whereby this device becomes conducting and, consequently, the device 53 is rendered non-conducting. The constants of the anode circuit of the device 53 are such that when this device is conducting, its anode potential is highly negative, e.g., of the order of 210 volts. When the device 53 is rendered non-conducting, its anode potential rises abruptly to 300 volts so that a positive pulse is impressed upon the control grid of the enabler device 35. The length of this pulse is determined by the time constant of the condenser 57 and resistance 55 combination and, in the case noted, is 3-milliseconds. At the end of the 3-millisecond period, the device 53 again becomes conducting, its anode potential falls to 210 volts negative and the device 54 is blocked; these conditions obtain until another triggering pulse is applied to the grid of the device 54, i.e., until the next succeeding 50-millisecond pulse period of the timer 15.

When the enabler device 35 is rendered conducting, its cathode potential rises sufficiently to overcome the blocking bias upon the screen grid of the oscillator device 30, whereby the latter is enabled, the condenser 31 discharges, and a 3-millisecond, 27-kilocycle high power pulse is propagated by the transducer 10.

The resistance 56 is made very small, particularly in comparison to the resistance 52, so that upon operation of armature 47 to engage its associated contact 49, the condenser 58 charges very quickly. Because of the relative magnitudes of the resistors 56 and 52, relay chatter will not deleteriously affect the circuit for condenser 58. Further, inasmuch as resistor 52 is relatively large, charging of the condenser 58 to effect triggering of the pulser, by leakage of power in the equipment is guarded against. In general, as a result of correlation of the parameters for the circuits including the condenser 58, discrimination upon the basis of the shape of pulses received by the condenser 58 is realized; that is, the triggering circuit responds to the sharp or steep wave front pulses produced by operation of the relay 46 but is relatively insensitive to slowly increasing pulses.

It will be noted that the high power oscillator 11 is controlled expeditiously by the timer 15, which may be of relatively low power, by way of the intermediate power enabler 14. Further, inasmuch as the oscillator device 30 is keyed by control of its screen grid potential, control of the oscillator is effected independently of the oscillating circuit.

Figure 3:
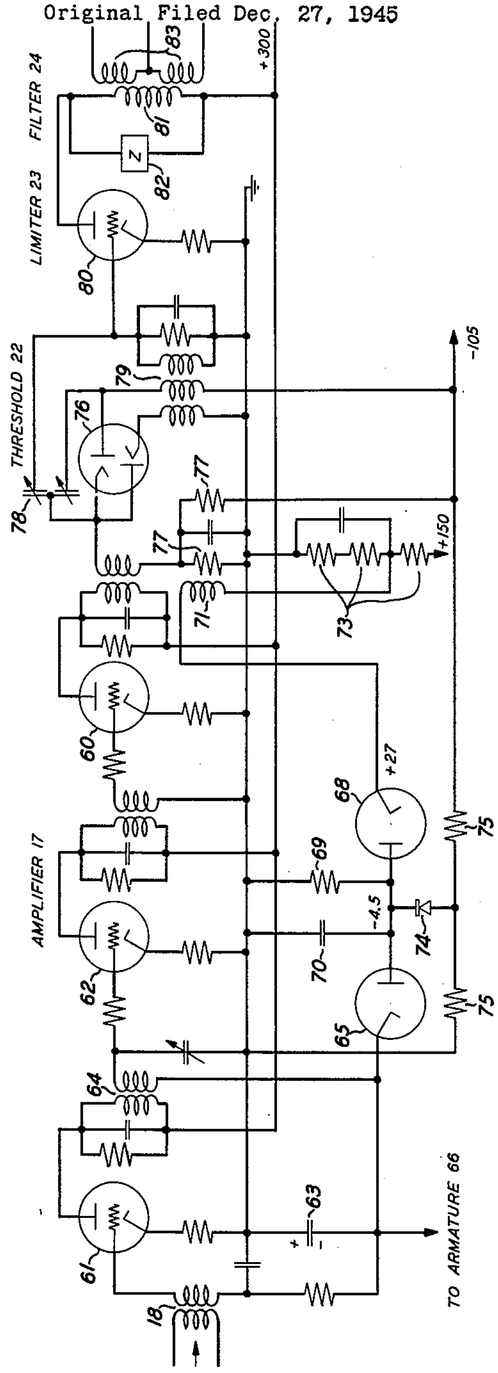
FIG. 3 is a circuit diagram illustrating details of one of the receiver channels included in the system shown in FIG. 1.

The amplifier 17 in each receiver channel comprises, as shown in FIG. 3, three transformer coupled stages advantageously fairly broadly tuned to allow for Doppler effect and possible variations in the frequency of the oscillator 11. The last stage electron discharge device 60 is of fixed gain; the first two-stage devices 61 and 62 are provided with automatic gain control effected by control of the control grid potentials by way of a condenser 63, one terminal of which is connected to the grounded cathodes of the devices 61 and 62. The other terminal of the condenser, which is connected to the control grids by way of the secondary windings of the input transformer 18 and coupling transformer 64 respectively, is tied also to the cathode of the diode 65 and to the armature 66 of the relay 46, the associated contact 67 being connected to a point of negative potential, e.g., 6 volts, as shown in FIG. 2.

Connected in parallel relation between ground and the anodes of the diode 65 and a second diode 68 are a resistance 69 and a second condenser 70 the capacitance of which is much smaller than, for example of the order of one-tenth, that of the condenser 63. The cathode of the diode 68 is connected, by way of an auxiliary winding 71 in the output transformer 72, to a potential divider 73 such that it is biased positively, for example at approximately 27 volts in a particular case. A relatively small negative bias, for example substantially 4.5 volts, is applied to the anodes of both diodes 65 by way of a non-linear device 74, for example a rectifier of the disc type, and a voltage divider defined by the resistors 75.

When the relay 46 operates, the condenser 63 is charged negatively, e.g., to 6 volts, to bias the control grids of the discharge devices 61 and 62 at substantially cut-off so that both receiver channels are disabled for the period during which this relay remains operated, i.e., substantially 50 milliseconds in the specific case noted heretofore. In general, this period is set, considering both surface and volume reverberation and the normal running depth of the torpedo, so that at the end thereof the reverberation level at the transducer 10 is approximately the maximum likely to be encountered. At the end of the 50-millisecond period, the charging circuit for the condenser 63 is opened by release of the relay 46 and th condenser begins to discharge through the resistor 69 and the diode 65, the circuit constants being such that the condenser voltage decays at a rate somewhat faster than the rate of decrease of the average reverberation level. In a typical case for a pulse recurrence rate of once per second, a time constant of 130 milliseconds for the condenser discharge circuit is satisfactory.

As the condenser 63 discharges, the bias upon the grids of the devices 61 and 62 decreases accordingly and the gain of the amplifier increases. The condenser continues to discharge as long as the diode 68 remains non-conducting and this condition is determined by the output level at the transformer 72. When this output is of such magnitude as to produce at the auxiliary winding 71 a voltage exceeding that across the resistor 69 plus the bias upon the diode 68, the latter conducts, and builds up a negative potential on condenser 70. Consequently, when the potential on condenser 70 becomes more negative than the potential on condenser 63, the diode 65 is blocked and discharge of the condenser 63 ceases. The transformer constants are made such in relation to the bias upon the diode 68 that this bias may be overcome by reverberation signals for even the most favorable conditions, i.e., for sea conditions resulting in a low reverberation level.

At the end of the 50-millisecond period, and assuming that the output at the transformer 72 is due to reverberation, the gain of the amplifier increases quickly until the output is sufficient to render the device 68 conducting, whereupon the condenser 70 is charged and discharge of condenser 63 is interrupted. As noted heretofore, the capacitance of condenser 70 is small in comparison to that of condenser 63. Hence, the condenser 70 discharges quickly through the resistor 69 and the condenser resumes discharging until the output at the transformer 72 again is sufficient to cause conduction of the diode 68. This process is continuous so that once the amplifier gain increases sufficiently to allow operation of the diode 68 by reverberation, thereafter the gain of the amplifier is controlled in accordance with reverberation. Specifically, the gain increases as the reverberation decreases. Thus, the reverberation component of the amplifier output is maintained substantially constant.

When a signal pulse due to an echo appears at the transformer 72, and is of sufficient amplitude to exceed the bias upon the diode 68 plus the voltage across condenser 63, the condenser 70 is charged proportionately to the excess, discharge of the condenser 63 is arrested and the amplifier gain remains constant for substantially the duration of the signal pulse. Following cessation of the pulse, the gain is returned to control in accordance with the reverberation.

The resistance of the non-linear device 74 and that of the left resistor 75 are made small in comparison to that of the resistor 69 so that the discharge circuit for the condenser 70 includes a relatively low resistance path, defined by the device 74 and left-hand resistor 75, in parallel with the path defined by the resistor 69. Consequently, following receipt of a signal pulse of the character noted to place a charge upon the condenser 70, the latter discharges quickly until the potential across the device 74 is such that this device is non-conducting. Thus, the time for which a charge can remain upon the condenser 70 is limited and undue delay in the resumption of discharge of the condenser 63 following receipt of an echo signal is prevented. Consequently, a weak echo signal following a strong echo signal will be detected by the system and appear of proper amplitude in the output of the amplifier.

It is apparent, then, that by virtue of the action of the gain control 21, the reverberation component of the amplifier output is maintained substantially constant while the echo signal components appear as pulses in the output.

The output of the amplifier is supplied to the threshold device 22 which, as shown in FIG. 3, comprises the twin diode 76 both portions of which are biased by way of equal resistors 77 to prevent transmission of signals of less than a preassigned peak value and, thus, to suppress spurious pulses, such as reverberation peaks, which may appear in the amplifier output. Condensers 78, differentially connected, are provided to balance the diode and circuit capacitances so that complete suppression of signals of less than the preassigned value is realized.

The signals passed by the threshold device are supplied, by way of the transformer 79, to the input circuit of the electron discharge device 80 which functions as a limiter to provide an output of substantially constant amplitude and, thus, to eliminate effectively amplitude differences in the signals applied to the filter 24.

The latter, which may be of generally conventional configuration comprises the terminating coil 81, which, together with other impedances generalized in block form at 82 in the drawing, is designed so that only signals within a restricted band of frequencies, as noted heretofore, are passed. The coil 81 is coupled in transformer relation to the split secondary coil 83.

As is apparent, the signals appearing at the outputs of the filters in the two channels of the receiver differ from one another essentially only in phase, amplitude differences between the signals in the two channels having been eliminated by the threshold devices 22 and limiters 23. The outputs of the two channels, one shifted in phase 90 degrees, are combined in sum and difference relation to produce a resultant direct current potential across the condenser 28, of polarity determined by the sign of the phase difference between the outputs noted and of amplitude substantially linearly proportional to the magnitude of this phase difference. Hence, inasmuch as the phase difference noted is determined by the relative phase of the outputs of the transducer halves 10A and 10B, the resultant direct current potential obtained is of polarity determined by and amplitude proportional to the angle between the longitudinal axis of the torpedo and the target. Stated in another way, the echoes emanating from the target are resolved into a control potential which is a measure of the bearing of the target relative to the torpedo; this control potential is independent of the absolute level of the echo signals received, i.e., its magnitude is determined only by the target-torpedo bearing.

Figure 4:
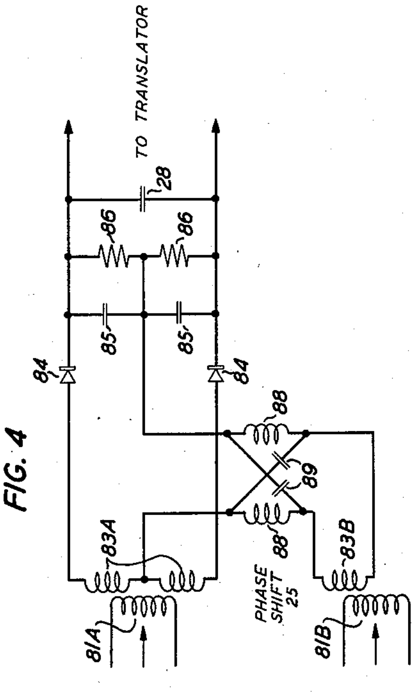
FIG. 4 is another circuit diagram showing the construction of the phase sensitive detector and its association with the two receiver channels in the system illustrated in FIG. 1.

Details of the phase sensitive detector 26 are shown in FIG. 4. The coils 83A are connected in series with similarly poled rectifiers 84, for example of the copper disc type, and equal condensers 85 which are bridged individually by equal resistors 86 in turn connected across the output or terminating condenser 23. The secondary coil 83B is connected between the common terminal of the coils 83 and that of the condensers 85 by way of a lattice network comprising the series inductances 88 and diagonal condensers 89 correlated to introduce a substantially 90-degree phase shift at all frequencies in the restricted band of frequencies supplied thereto.

It will be noted that inasmuch as the phase shift is introduced beyond the output of the B channel, such random noise disturbances as may be passed by the two channels are transmitted to the rectifiers 84 substantially equal and at 90-degree phase relationship and, hence, the disturbances cancel one another in the phase sensitive detector; that is such disturbances are translated so that effectively they correspond to "on target" control signal.

The direct current control signal produced by the detector, as noted heretofore, is utilized to control the translator in such manner as to steer the torpedo toward the target.

Although a specific embodiment of the invention has been shown and described, it will be understood that it is but illustrative and that various modifications may be made therein without departing from the scope and spirit of this invention as defined in the appended claims.

What is claimed is:

1. A multivibrator comprising a first and a second electron discharge device each having an output electrode and a control electrode, a first resistance-condenser timing circuit coupling the output electrode of said second device to the control electrode of said first device, a second resistance-condenser timing circuit coupling the output electrode of said first device to the control electrode of said second device, an auxiliary electron discharge device having a control electrode coupled to said second device so that the potential of said auxiliary device's control electrode follows that of the output electrode of said second device, said auxiliary device being conductive only when the potential of said output electrode of said second device is of at least a preassigned positive value, a normally open discharge circuit including a resistance arranged to be included with the condenser in said second timing circuit, and means for closing said discharge circuit when said auxiliary device is conductive.

2. An unsymmetrical vibrator for producing pulses of short length relative to the interval between pulses, comprising a first and a second electron discharge device each having a cathode, control electrode and anode, a first timing circuit, including a condenser, for determining said interval, coupling the anode of said second device to the control electrode of said first device, a first auxiliary electron discharge device defining a low impedance discharge path for said condenser and having a control electrode connected to the anode of said second device so that its potential follows that of the anode of said second device, a resistor in the cathode circuit of said auxiliary device, a second auxiliary electron discharge device having a control electrode connected to said resistor so that its potential follows that of the cathode of said first auxiliary device, said second auxiliary device being constructed and arranged to conduct when the cathode of said first auxiliary device is highly positive, a timing condenser coupling the anode of said first device to the control grid of said second device, a normally open resistive circuit connected with said timing condenser for determining said pulse length, and means operable when said second auxiliary device conducts for closing said resistive circuit.

3. A pulse generator for producing pulses of short length relative to the interval between pulses, comprising a pair of electronic devices each having a control electrode and an output electrode, a timing circuit for determining said interval and interconnected between the output electrode of one of said devices and the control electrode of the other of said devices, a first auxiliary electronic device defining a low impedance discharge path for a portion of said timing circuit and having a control electrode connected to the output electrode of said one device so that its potential follows that of the anode of said one device, a resistor in the output circuit of said auxiliary device, a second auxiliary electronic device having a control electrode connected to said resistor so that its potential follows that of a point on said resistor, said second auxiliary device conducting when the potential on said point is highly positive, a timing electrical storage device interconnecting the output electrode of said other device to the control electrode of said one device, a normally-opened resistive circuit connected with said storage device for determining said pulse length, and means operable when said second auxiliary device conducts for closing said resistive circuit.

4. A multivibrator comprising a first electron discharge device and a second electron discharge device, each of said devices including an anode, a cathode and a control electrode, a first resistance-condenser timing circuit coupling the anode of said first device and the control electrode of said second device, and a second resistance-condenser timing circuit coupling the anode of said second device and the control electrode of said first device, said second circuit including a third electron discharge device having an anode, a cathode and a control electrode, and a load impedance for said third device connected in the cathode lead of said third device, the condenser of said second timing circuit being connected between the control electrode of said first device and the cathode end of said load impedance and the control electrode of said third device being connected directly to the anode of said second device.

5. A multivibrator comprising a first electron discharge device and a second electron discharge device, each of said devices including an anode, a cathode and a control electrode, a first resistance-condenser timing circuit coupling the anode of said first device and the control electrode of said second device, and a second resistance-condenser timing circuit coupling the anode of said second device and the control electrode of said first device, said second circuit including an electron discharge device circuit of the cathode follower type coupled to said second device and with its anode-cathode space path in series connection with the condenser of said second circuit, and said second circuit condenser being connected between the control electrode of said first device and the cathode of the cathode follower circuit discharge device.

References Cited in the file of this patent

UNITED STATES PATENTS

| | | |
|---|---|---|
| 1,613,954 | Knoop | Jan. 11, 1927 |
| 2,442,769 | Kenyon | June 8, 1948 |
| 2,469,031 | Canfora | May 3, 1949 |
| 2,502,687 | Weiner | Apr. 4, 1950 |
| 2,514,677 | Skellett | July 11, 1950 |
| 2,519,278 | Oliver | Aug. 15, 1952 |